United States Patent
Borghesani et al.

(10) Patent No.: US 7,428,737 B1
(45) Date of Patent: *Sep. 23, 2008

(54) METHOD FOR USING HEADER FILES TO CALL A SHARED LIBRARY FROM A DYNAMIC ENVIRONMENT

(75) Inventors: Philip Borghesani, Acton, MA (US); Thomas Gaudette, Jamaica Plain, MA (US)

(73) Assignee: The MathWorks, Inc., Natick, MA (US)

( * ) Notice: Subject to any disclaimer, the term of this patent is extended or adjusted under 35 U.S.C. 154(b) by 665 days.

This patent is subject to a terminal disclaimer.

(21) Appl. No.: 10/725,859

(22) Filed: Dec. 1, 2003

(51) Int. Cl.
*G06F 9/44* (2006.01)
(52) U.S. Cl. .................. 719/332; 719/328; 717/163
(58) Field of Classification Search ............ 719/310, 719/328, 331–332; 717/100, 101, 108, 111, 717/114, 116, 120, 121, 163
See application file for complete search history.

(56) References Cited

U.S. PATENT DOCUMENTS

| | | | | |
|---|---|---|---|---|
| 5,634,114 A | * | 5/1997 | Shipley | 717/170 |
| 5,761,510 A | * | 6/1998 | Smith et al. | 717/124 |
| 5,995,100 A | * | 11/1999 | Auslander | 715/744 |
| 6,067,577 A | * | 5/2000 | Beard | 719/331 |
| 6,074,432 A | * | 6/2000 | Guccione | 717/108 |
| 6,442,752 B1 | * | 8/2002 | Jennings et al. | 717/162 |
| 6,615,253 B1 | * | 9/2003 | Bowman-Amuah | 709/219 |
| 6,874,148 B1 | * | 3/2005 | Richardson et al. | 719/328 |
| 7,146,387 B1 | * | 12/2006 | Russo et al. | 707/204 |
| 7,165,253 B1 | * | 1/2007 | Pike et al. | 718/102 |
| 7,171,673 B1 | * | 1/2007 | Steinman et al. | 719/331 |

OTHER PUBLICATIONS

Wheeler "Program Library HOWTO", Apr. 2003, pp. 1-3.*
Huber et al "Modeling Dynamic Component Interfaces", IEEE 1998, pp. 1-13.*
Engelschall "Apache 1.3 Dynamic Shared Object (DSO) Support", 1998, pp. 1-5.*

* cited by examiner

*Primary Examiner*—Van H Nguyen
(74) *Attorney, Agent, or Firm*—Lahive & Cockfield, LLP; Kevin J. Canning

(57) ABSTRACT

A method and apparatus executes an automated approach allowing access to a standard shared library without requiring the user to create a custom interface definition for library functions that a user wants to access dynamically using a software application. In accordance with one implementation, in an electronic device, a method of accessing a library function from a dynamic environment includes the step of processing a header file of the library function to create an interface to the library function. The interface to the library function is created in the dynamic environment. The user can invoke the process by calling the function from the shared library, and the automated process takes the necessary steps to execute the function.

28 Claims, 6 Drawing Sheets

METHOD FOR USING HEADER FILES TO CALL A SHARED LIBRARY FROM A DYNAMIC ENVIRONMENT

FIELD OF THE INVENTION

The present invention relates to an automated process suitable for calling a function residing in a shared library, and more particularly to reading and interpreting a header file to call a library function from a dynamic environment.

BACKGROUND OF THE INVENTION

In many different computer environments, there is often a need for one software application to be able to call external functions that are not part of the software application. In many programming languages, such as the C programming language, there are groups of functions that can be called by any number of different software applications. One example programming language is the C programming language.

In the C programming language, the callable functions have C header files that describe the content of the function, and what information is required to call and execute the function. More specifically, C header files are files that are included in other files prior to compilation by the C preprocessor. Header files can be in the form of system header files, which declare the interfaces to parts of the operating system. The system header files most often contain information such as definitions and declarations that are needed in order to call or invoke the system calls and libraries. Header files can also be in the form of program specific files, which contain declarations for interfaces between the source files of the program. Header files also contain data declarations and definitions utilized by more than one program. A header file can contain information for one or more functions, modules, or libraries.

In interactive programming environments, there is often a need for the interactive programming environment to interact with existing components and applications from third parties. There are a number of different approaches utilized to enable such functionality. In accordance with one method, a custom interface is created to allow the high level language (HLL) of the interactive environment to call into a shared library. Doing so requires all users to build their own custom interface to call into existing code.

In accordance with another example method, an existing portable component interface is utilized. The component must be written to be compliant with the given interface. For example, Microsoft Corporation's Component Object Model (COM), and the Object Management Group's Common Object Request Broker Architecture (CORBA) provide such interfaces.

A third example method is to create a way for the user to define the interfaces present in a shared library that was designed to be called from a standard programming language, such as the C programming language. A special document or library definition custom to the application must be created by the user (or additionally provided) that defines the interface to the library. There is no mechanism for automatically creating the special document, the custom library definition, or any form of library function interface that defines the interface to the library.

SUMMARY OF THE INVENTION

There is a need for an automated approach allowing access to a standard shared library without requiring the user to create a custom interface definition for library functions that a user wants to access in a dynamic environment software application. The present invention is directed toward further solutions to address this need.

In accordance with one embodiment of the present invention, in an electronic device, a method of accessing a shared library from a dynamic environment includes the step of processing a header file of a library function defining desired functions to extract information for creating an interface to the library function. The interface to the library function is created in the dynamic environment.

In accordance with aspects of the present invention, processing the header file includes automatically defining parameters for the interface to the library function based on the header file. The step of automatically defining parameters for the interface to the library function based on the header file includes creating at least one data structure having selected parameters for interfacing with the library function.

In accordance with further aspects of the present invention, the step of processing the header file includes automatically ensuring inputs to the interface to the library function are in the form of selected data types based on the header file. Automatically ensuring inputs to the interface to the library function are in the form of selected data types based on the header file includes the interface converting data types to the selected data types for the library function.

In accordance with further aspects of the present invention, the shared library can be a DLL file, an ".so" file, and the like. The header file can be a C header file.

In accordance with further aspects of the present invention, the method can further include the step of saving the interface to the library function in a file executable from the dynamic environment for subsequent use. A command to call the library function can be received. The library function can be executed using the interface from the shared library.

In accordance with one embodiment of the present invention, in an electronic device, a method of accessing a library function from a dynamic environment includes the step of loading the library function from a shared library. An interface to the library function is automatically generated. The library function is executed using the interface from the shared library.

In accordance with one embodiment of the present invention, an electronic device includes an application providing a dynamic environment. A shared library is accessible by the dynamic environment. An automated processing function is provided for automatically extracting information for creating an interface to a library function to enable execution of the library function from the shared library.

In accordance with one embodiment of the present invention, a medium is provided for use in a modeling and execution environment on an electronic device. The medium holds instructions executable using the electronic device for performing a method of accessing a library function from a dynamic environment. The method includes the steps of processing a header file of the library function to extract information for creating an interface to the library function, and creating the interface to the library function in the shared library.

BRIEF DESCRIPTION OF THE DRAWINGS

The present invention will become better understood with reference to the following description and accompanying drawings, wherein.

DETAILED DESCRIPTION

Figure 1:
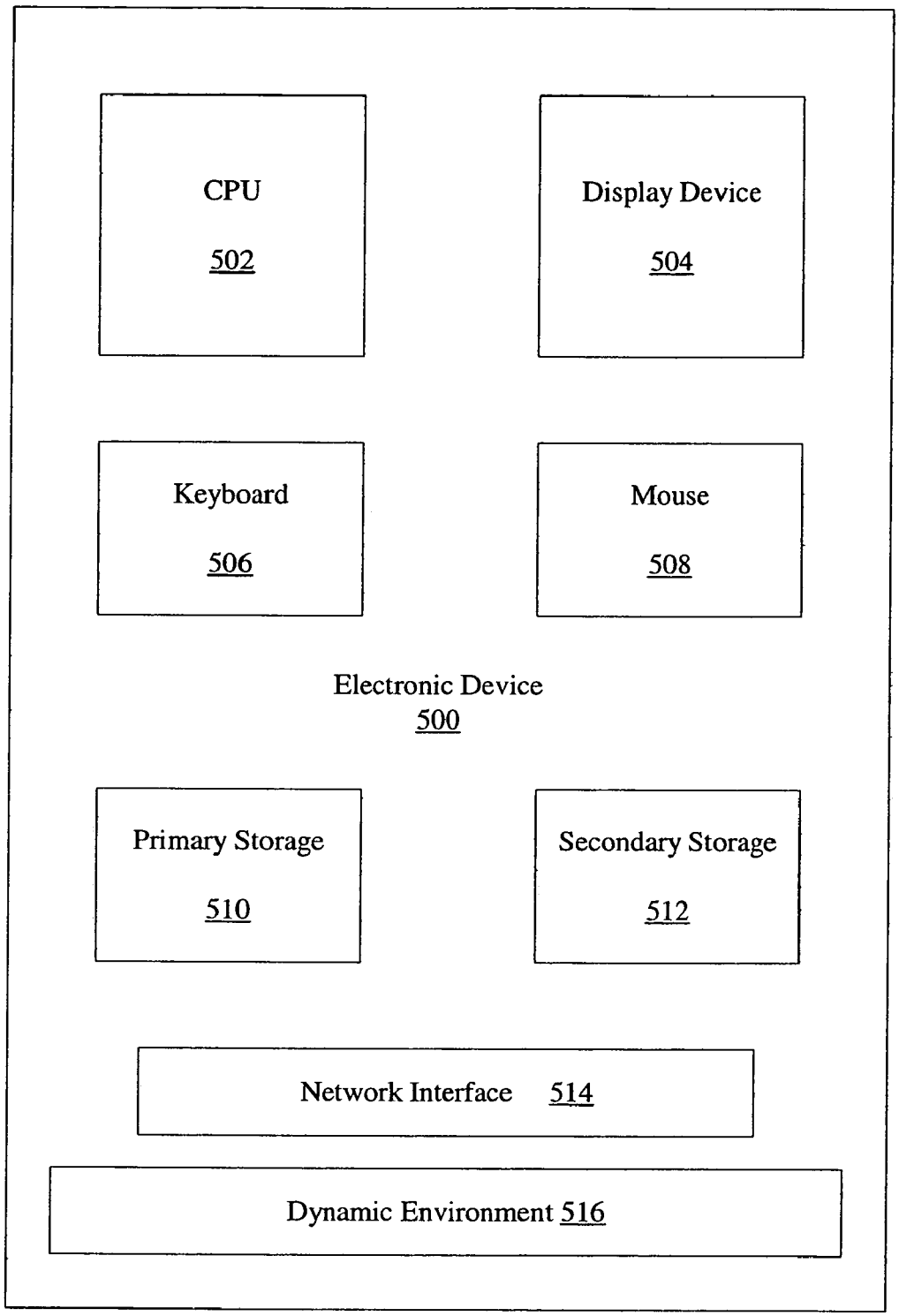
FIG. 1 is a diagrammatic illustration of an electronic device for executing a method, according to one aspect of the present invention.

An illustrative embodiment of the present invention relates to the use of an interactive and dynamic environment to interact with existing components and applications, such as library functions. There are a number of different approaches utilized to enable such functionality. In accordance with one method, a custom interface is automatically created to allow a high level language of the interactive and dynamic environment to call into a shared library to access a library function without the user having to manually construct the interface to the library function.

FIGS. 1 through 6, wherein like parts are designated by like reference numerals throughout, illustrate an example embodiment of an automated process for providing a user with access to invoke a library function from a dynamic environment according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, in a manner still in keeping with the spirit and scope of the present invention.

For purposes of explanation, features and aspects of the present invention will be described in the context of the interactive programming environment of a dynamic environment application illustrated by the MATLAB® application by The Mathworks, Inc. of Natick, Mass. A dynamic environment application is a program that encounters an instruction and can dynamically execute the instruction before proceeding to a next instruction, often without the need for sending the instruction to a compiler. The dynamic environment application is an alternative to an application needing a compiler that translates input into executable object code. It may be possible to execute the same source code either directly by a dynamic environment application, or by compiling it and then executing the object code or machine code that results. More detail is provided below as to some of the specific attributes of the MATLAB® application. However, one of ordinary skill in the art will appreciate that there are a number of different dynamic applications and environments from which users would like to access other programs or code, such as library functions, such that the present invention is not limited to use with MATLAB®. For example, the present invention can be utilized with other applications, such as a graphical modeling application, e.g., Simulink®, provided by The Mathworks, Inc. of Natick, Mass. Simulink® is an interactive tool for modeling, simulating, and analyzing dynamic, multidomain systems. Simulink® enables a user to describe, simulate, evaluate, and refine a system's behavior through standard and custom block libraries. Simulink® integrates seamlessly with MATLAB®, if desired. Another graphical modeling application that can be utilized with the present invention is LabView® by National Instruments Corporation of Austin, Tex.

One example instance in which it is useful for an interactive programming application to be able to utilize C routines without having to operate a C compiler is when a user is attempting to use MATLAB® in conjunction with the operation of a piece of hardware, such as laboratory or testing equipment, that has its own software with a shared library having executable functions. The software shared library is provided along with the hardware to control operations and functions of the hardware. The shared library can contain one or more potentially related modules, and a module can contain one or more potentially related functions.

The software can be internal to the hardware component, or can be provided as a separate application, or with a separate shared library, that must be loaded and run on a computer that is in communication with the hardware component. Furthermore, the hardware itself can be in the form of the computer or other electronic device. As such, the following description makes use of MATLAB® to provide the example dynamic environment from which a user desires to control the operation of a piece of hardware.

FIG. 1 illustrates one example embodiment of an electronic device 500 suitable for practicing the illustrative embodiments of the present invention. The electronic device 500 is representative of a number of different technologies, such as personal computers (PCs), laptop computers, workstations, personal digital assistants (PDAs), Internet appliances, cellular telephones, wireless devices, and the like. In the illustrated embodiment, the electronic device 500 includes a central processing unit (CPU) 502 and a display device 504. The display device 504 enables the electronic device 500 to communicate directly with a user through a visual display. The electronic device 500 further includes a keyboard 506 and a mouse 508. Other potential input devices not depicted include a stylus, trackball, joystick, touch pad, touch screen, and the like. The electronic device 500 includes primary storage device 510 and secondary storage device 512 for storing data and instructions. The primary and secondary storage devices 510 and 512 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 510 and 512. The electronic device 500 can also include a network interface 514 for communicating with one or more electronic devices external to the electronic device 500 depicted. Modems and Ethernet cards, are examples of network interfaces 514 for establishing a connection with an external electronic device or network. The CPU 512 has either internally, or externally, attached thereto one or more of the aforementioned components. In addition to applications previously mentioned, modeling applications, such as MATLAB® or Simulink®, can be installed and operated on the electronic device 500 to provide a dynamic environment 516.

It should be noted that the electronic device 500 is merely representative of a structure for implementing the present invention. However, one of ordinary skill in the art will appreciate that the present invention is not limited to implementation on only the described device 500. Other implementations can be utilized, including an implementation based partially or entirely in embedded code, where no user inputs or display devices are necessary. In such an instance, a processor can communicate directly with another processor, or other device.

Figure 2:
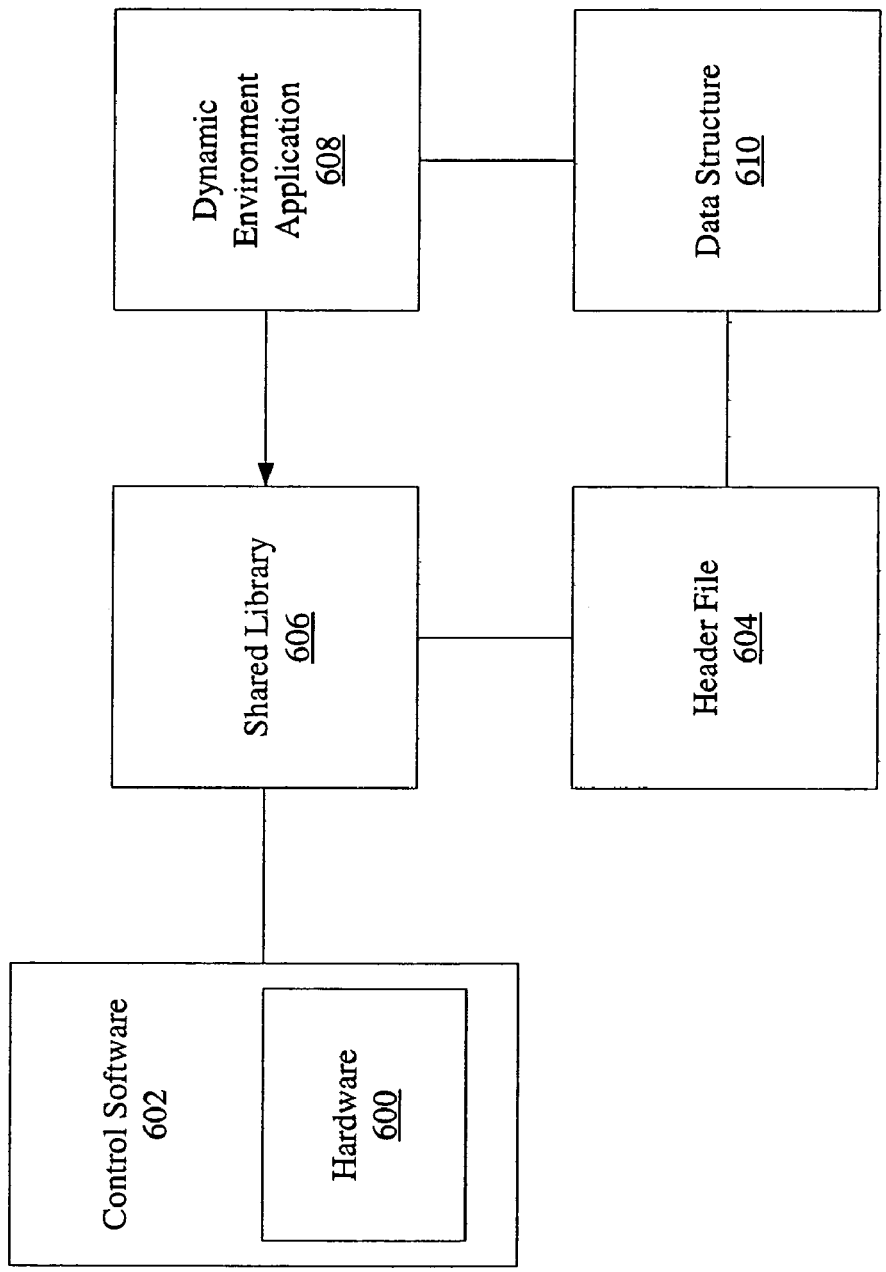
FIG. 2 is a diagrammatic illustration of interacting components forming an automated process of calling and executing library functions, according to one aspect of the present invention.

The present invention enables a user to have access to a shared library without requiring the user to create a custom interface. FIG. 2 is a diagrammatic illustration of an example system that can make use of the present invention. Take for example, a piece of hardware 600 provided in a lab or other scientific, research, or academic environment. The hardware 600 has a number of possible functions including as a measuring or testing device. The hardware includes at least one control software 602 application in communication with the hardware 600 to control and operate the hardware 600. For example, the hardware 600 can be an oscilloscope, a thermocycling device, a mixing device, a heating or cooling device, and/or any number of other devices that perform some desired operation. Each of the example hardware 600 devices includes at least a simple control algorithm in the form of the control software 602. The control software 602 includes a hardware driver. The control software instructs the hardware 600 in terms of operation, measurement, data collection, data storage, interfacing with networks and/or other devices, and the like, depending on the particular functionality of the hardware 600 and the complexity of the control software 602. One of ordinary skill in the art will appreciate that the above description of hardware 600 and control software 602 examples and features are merely illustrative of possible systems that can make use of the present invention. However, the present invention is not limited to such systems. The present invention is applicable to any software component that has at least one function accessible through a shared library and is required for use in a dynamic environment.

As mentioned above, the control software 602 includes at least one function, or library function, in the form of a C header file 604 in the instance where the control software 602 is compatible with the C programming language. Again, the C programming language is utilized in the present description as one example embodiment of the present invention. The present invention is not limited to use with C compatible applications.

As understood by those of ordinary skill in the art, the library function, or C header file 604, is a file that is included in other files while being complied by the C preprocessor. There are some C header files that are defined at a system level, such as "stdio.h", which is necessary for any program using the standard input/output (I/O) library. The C header file can include data declarations and definitions. A statement "#include" is utilized to include standard libraries and other C header files, such as custom libraries, that are accessible by a program and required for operation. A good example of a custom library C header file is one that is written specifically to control an operation or feature of a specific piece of hardware, such as the hardware 600 of the present example.

As illustrated, the C header file 604 library function is stored as a separate file from a shared library 606. In the present illustration, the shared library is in the form of a Dynamic Link Library (DLL). The C header file 604 functions, in the case of software operating on the Windows® operating system provided by Microsoft Corporation of Redmond, Wash., are known as Dynamic Link Library (DLL) functions. The DLL functions are stored in a DLL.

The DLL is a library of executable functions that can be used by any Windows® compatible software application. The DLL typically stores a plurality of functions. The Windows® compatible software application accesses the functions by creating either a static, or dynamic, link to the DLL. A static link is created when the program is compiled and remains constant during program execution. The final connection between the software and the DLL is when they are loaded or executed, rather than as the final phase of compilation. A dynamic link is created by the program before the software application calls the DLL functions, and can be released before the program terminates. There is no information required about the DLL functions when the application is compiled. In addition, one block of shared library code can be shared between several software applications, rather than requiring that each software application copy the code that forms each DLL function, and separately compiling.

One of ordinary skill in the art will appreciate that the DLL and DLL functions are merely examples of executable functions in the Windows® environment. There can be other dynamically linked functions in other environments, including shared object (".so") files in SunOS® (provided by Sun Microsystems of Burlington, Mass.) and re-allocatable modules in RISC OS (provided by RISC OS, Ltd. of Cardiff, England). As such, the present invention is not limited to use with the Windows® operating system and DLLs. In addition, there can be a plurality of DLLs accessible by software applications at any one time.

The present invention enables a user in a dynamic environment, such as the MATLAB® application, to access the C header files 604 in a manner that enables control of the hardware 600. MATLAB® is an interactive programming application that can implement a variety of computing tasks in engineering and science, while also having the ability to execute other executable programs dynamically. Some of the tasks that MATLAB® can perform range from data acquisition and analysis to application development. The MATLAB® environment integrates mathematical computing, visualization, and technical programming language. MATLAB® includes built-in interfaces that provide access and import data from instruments, files, and external databases and programs.

In addition, MATLAB® can integrate external routines written in C, C++, Fortran, and Java with MATLAB® applications. As such, MATLAB® provides an example of the interactive programming and dynamic environment that can work in conjunction with C routines provided external to MATLAB®, including those provided by third party providers.

Although MATLAB® includes the above features, for purposes of the present application and description, the ability of MATLAB® to exemplify the dynamic environment from which library functions are desired to be called is the reason for using MATLAB® as the illustrative dynamic environment application 608. One of ordinary skill in the art will appreciate that a variety of other software applications can be utilized in accordance with the present invention as will be described below.

As previously mentioned, one example instance in which it is useful for dynamic environment application 608 to be able to utilize C routines is when a user is attempting to use MATLAB® in conjunction with the operation of the hardware 600, such as laboratory or testing equipment, that has its own software application with executable functions. The control software 602 controls operations and functions of the hardware 600. The control software 602 can be internal to the hardware 600 component, or can be provided as a separate application that must be loaded and run on an electronic device 500 that is in communication with the hardware 600. Furthermore, the dynamic environment application 608 can likewise operate internally within the hardware 600 component, on the electronic device 500 that is operating the control software 602, or on a separate electronic device 500 that can directly or indirectly communicate with the control software 602 to operate the hardware 600.

The control software 602 can be another application designed to work in conjunction with MATLAB®, or can be a third party application that has no specifically designed custom interface with MATLAB®.

As will be discussed in further detail below, the dynamic environment application 608 follows the method of the present invention to automatically generate a data structure 610, and corresponding usage code, to interface with the C header file 604 library function in the shared library 606. As such, when a user of the dynamic environment application 608 (MATLAB® in the example illustration) wants to call a function to control or otherwise manipulate the hardware 600, the user makes use of the data structure 610 interface, and corresponding usage code, to access the C header file 604 and carry out the desired action.

Figure 3:
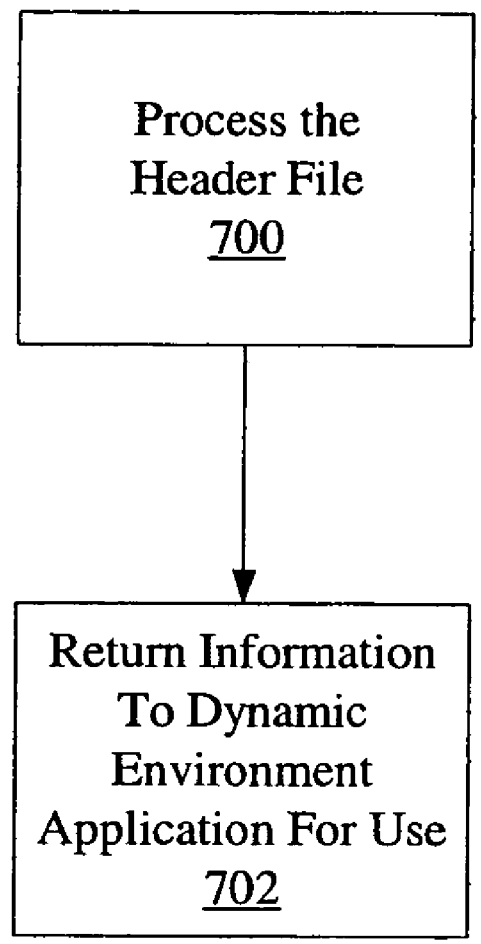
FIG. 3 is a flowchart illustrating the automated process of calling and executing library functions, according to one aspect of the present invention.

FIG. 3 is a flowchart illustrating the automated process that reads the C header file 604 library function and automatically generates the data structure 610 interface for carrying out a desired action relating to the hardware 600. The process is a two-step process. First, the C header file 604, or equivalent library function, for the shared library 606 is processed (step 700). Then, the processed information from the C header file 604 is returned to the dynamic environment application 608 for use (step 702).

Figure 4:
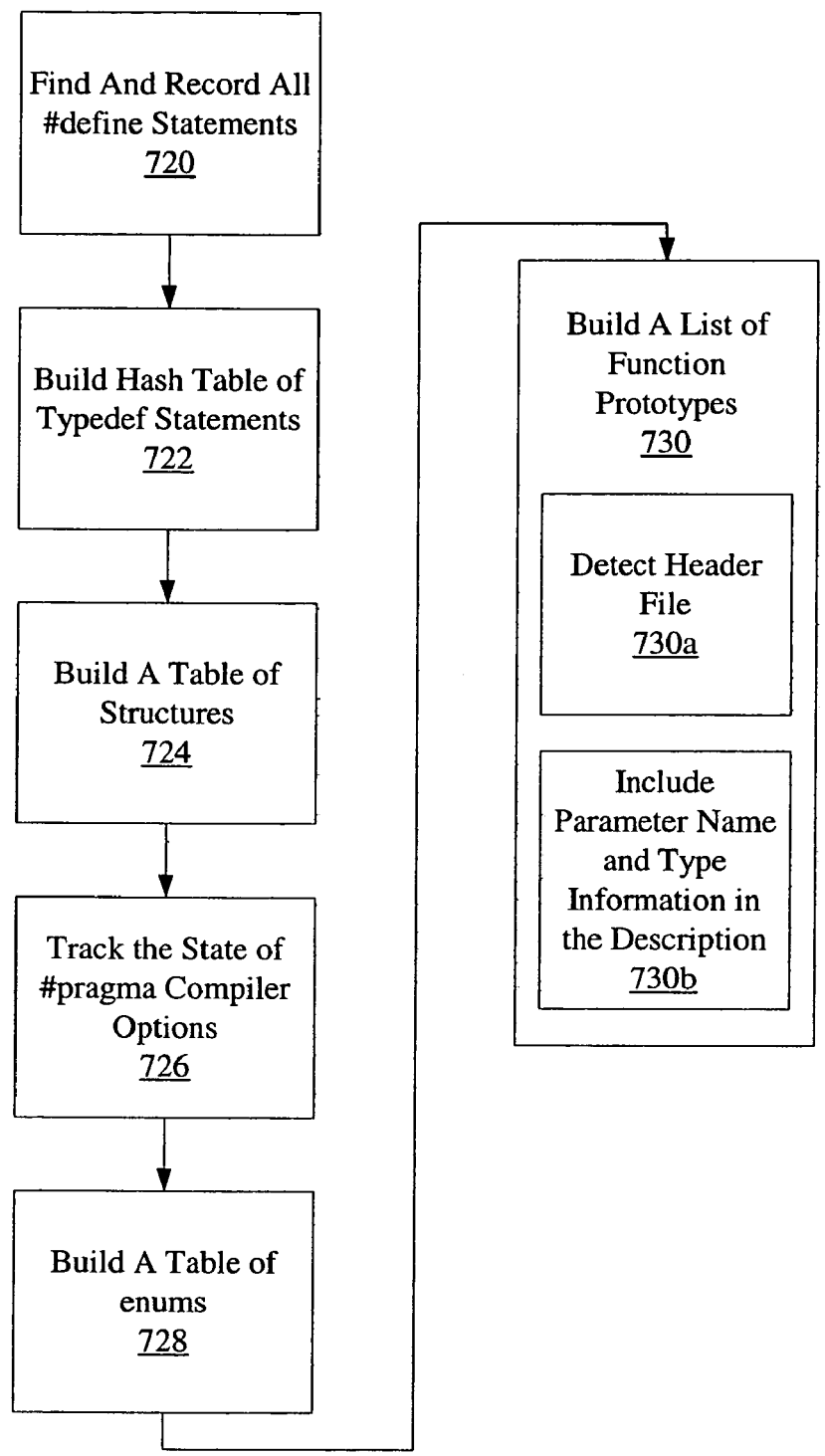
FIG. 4 is a flowchart providing further detail of the automated process of FIG. 3, according to one aspect of the present invention.

FIG. 4 is a flowchart illustrating a detailed example of the step of processing the C header file, step 700, of FIG. 3. One of ordinary skill in the art will appreciate that the following steps are exemplary of processing a C header file in the Windows® environment. Equivalent processes can be executed in both the Windows® environment, and other environments, as detailed above. Thus, the present invention is not limited to the specific steps of this illustrative example.

To process the C header file, all "#define" statements are located in the C header file and recorded (step 720). The #define preprocessor enables the user to define symbolic names and constants (such as setting a fixed number value for a named variable). A hash table is built of C types from typedef statements (step 722). The hash table is essentially a structure for providing access to data items which are distinguished by a key. Each data item to be stored is associated with a key. A hash function is applied to the item's key and the resulting hash value is used as an index to select one of a number of hash buckets in the hash table. The table contains pointers to the original items.

Continuing with the method, a table of structures is built, including all members, their names, and their data types (step 724). The structures are utilized to declare new data-types by grouping a plurality of variables together. The state of "#pragma" compiler options is tracked, including structure alignment setting for recording with structure information (step 726). The "#pragma" statements are defined by the C standard to be dependant upon an implementation.

A table of "enums" with all potential values is built (step 728). Enums are similar to #define's in that enums allow a user to define a list of aliases which represent integer numbers. Thus, a user can assign integer values to specified variables. Enums differ in that they also define a type that can be utilized to describe function parameters and must be entered into the C type hash table (see step 722).

A list of all function prototypes (or abstract function interfaces) found is built, optionally including prototypes from included headers (step 730). In order to carry this out, the header file being processed is detected from the "#line" statements (which specify the file and line number of the next source line) (step 730a), and all parameter name and type information is included in the description (step 730b). This completes the processing of the C header file.

Figure 5:
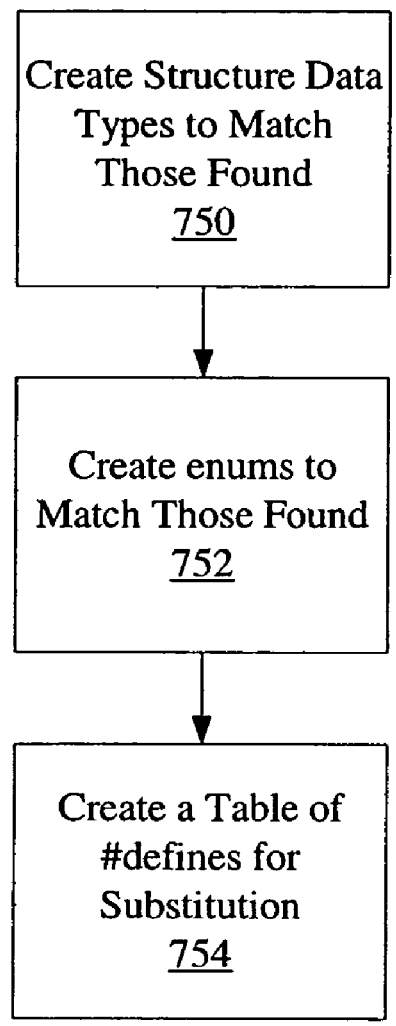
FIG. 5 is a flowchart providing further detail of the automated process of FIG. 3, according to one aspect of the present invention.

FIG. 5 is a flowchart illustrating a detailed example of the step of returning the processed information to the dynamic application, step 702, of FIG. 3. To return the processed information, a source file is built to be run in the dynamic environment application 608 that creates structure data types (step 750) to match those found in the C header file 604. Enums are created (step 752), also to match those found in the C header file 604. Further, a table of the "#defines" for substitution is made (step 754). This completes the return of processed information.

Figure 6:
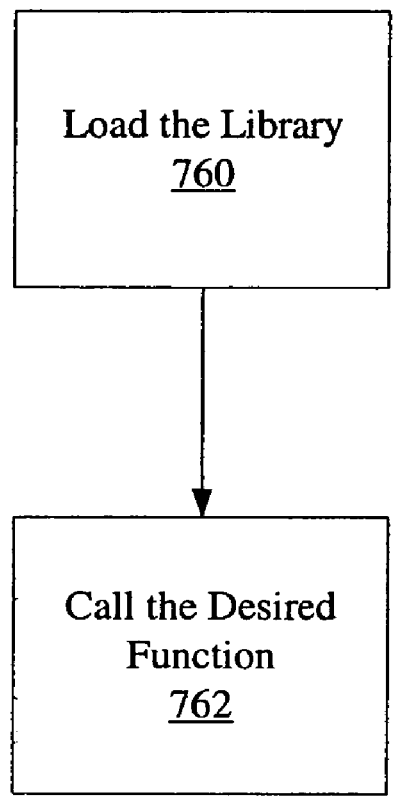
FIG. 6 is a flowchart illustrating a user implementation of the method of calling and executing library functions, according to one aspect of the present invention.

The automated process depicted in FIGS. 3, 4, and 5 enables streamlined and more efficient access by the user to the functions originating with the control software 602 of the hardware 600 that the user is attempting to control or access using the dynamic environment application 608. As a result of the processes that are automatically executed, the user sees a very simple interface for operating the functions in the shared library. FIG. 6 illustrates the process. To call a function, or library function, in a shared library, the user loads the library (step 760) and calls the function (step 762). The corresponding parameters for the function are automatically converted. This is more efficient than the prior known process that required the user to load the library, define the function parameters, convert inputs to the correct type, call the function, and post process return values, or variations thereof. The second, third, and fifth steps, and variations thereof, are eliminated from the list of tasks required of the user, and instead have been automated by the process of the present invention.

To further exemplify the more efficient and streamlined process made possible by the automation of the present invention, the following is an example implementation. In the example, the function "add", which exists in a shared library, is desired to be run. The function "add" is located in a library named "testlib". To load the library, the user enters the following at the command prompt:

Loadlibrary testlib.dll testlib.h

To call the function "add", the user enters the following at the command prompt:

Result = calllib ('testlib', 'add', 3, 2.56);

Alternatively, the user can enter the following at the command prompt to achieve the same result:

Result = testlib.add (3, 2.56);

The function "add" is then called and executes its code with respect to the values "3" and "2.56" that were entered. The result is "5.56," which is a summation of the two values entered.

Because of the automated C header file processing and the MATLAB® datatyping, the C function prototype could be any of the following examples and the correct answer would still be returned with no changes in the above code:

Double add(double p1, double, p2);

float add(float p1, float p2);

Double add(int p1, int p2); or float add(unsigned short p1, float p2).

The present invention, as implemented using the C programming language in the Windows® environment, provides direct input from C header files accessed by an dynamic application. The automated process reads the C header files, or other forms of library functions, and interprets what is necessary to interface with the C header file (or library function), and then creates the data structure, and processes the struct, to execute the interface. The process inherently detects the calling convention when it is not provided in the source, and can automatically import C structures. The process further inherently detects and implements the structure alignment pragma statements. The process also builds a structure that maps #defines to their corresponding numbers. Once again, the process can be implemented in interactive programming languages and operating environments having equivalent processes. The result is that a user interfacing with a dynamic environment can access a library function provided in a shared library to operate hardware, or execute desired computations, without having to manually build a custom interface.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

What is claimed is:

1. A computer-implemented method of accessing a library function in a shared library from a dynamic environment, comprising:
    processing a header file of the library function to automatically specify parameter information for creating an interface to access the library function, the processing automatically ensuring inputs to the interface to the library function are selected data types based on the header file;
    creating the interface to the library function in the shared library using the parameter information, the interface automatically converting a data type in an input to the interface to a selected data type for the library function; and
    saving the interface to the library function in an executable form for subsequent use.

2. The method of claim 1, wherein processing the header file further comprises automatically defining parameters for the interface to the library function based on the header file.

3. The method of claim 2, wherein automatically defining parameters for the interface to the library function based on the header file further comprises creating at least one data structure having selected parameters for interfacing with the library function.

4. The method of claim 1, wherein automatically ensuring inputs to the interface to the library function are selected data types based on the header file further comprises converting data types to the selected data types for the library function with the interface.

5. The method of claim 1, wherein the shared library comprises one of a Dynamic Link Library (DLL) file and a file with a shared object (.so) file extension.

6. The method of claim 1, wherein the header file comprises a C header file.

7. The method of claim 1, further comprising receiving a command to call the library function.

8. The method of claim 1, further comprising executing the library function using the interface from the shared library.

9. The method of claim 1, wherein the dynamic environment comprises at least one of a text-based modeling application and a graphical-based modeling application.

10. A computer-implemented method of accessing a library function in a shared library from a dynamic environment, comprising:
    loading the library function from the shared library;
    processing a header file of the library function and extracting information for creating an interface to the library function, the processing automatically defining parameters for the interface to the library function based on the header file;
    generating an interface to access the library function as a result of the processing, the interface automatically converting a data type in an input to the interface to a selected data type for the library function;
    saving the interface to the library function in an executable form for subsequent use; and
    executing the library function using the interface from the shared library.

11. The method of claim 10, wherein automatically defining parameters for the interface to the library function based on the header file further comprises the electronic device creating at least one data structure having selected parameters for interfacing with the library function.

12. The method of claim 10, wherein processing the header file further comprises automatically ensuring inputs to the library function are in the form of selected data types based on the header file.

13. The method of claim 12, wherein automatically ensuring inputs to the library function are in the form of a selected data type based on the header file further comprises the interface converting data types to the selected data types for the library function.

14. The method of claim 10, wherein the shared library comprises one of a Dynamic Link Library (DLL) file and a file with a shared object (.so) file extension.

15. The method of claim 10, wherein the header file comprises a C header file.

16. The method of claim 10, wherein the dynamic environment comprises at least one of a text-based modeling application and a graphical-based modeling application.

17. A computer-implemented system for calling a shared library from a dynamic environment, the system comprising:
    a storage; and
    a processor configured to:
        execute an application providing a dynamic environment,
        execute a shared library accessible by the dynamic environment,
        execute an automated processing function for processing a header file of a library function in the shared library to automatically specify parameter information for creating an interface to the library function, the processing automatically ensuring inputs to the interface to the library function are selected data types based on the header file; and
        save the interface to the library function in an executable form for subsequent use.

18. The system of claim 17, wherein the shared library comprises one of a Dynamic Link Library (DLL) file and a file with a shared object (.so) file extension.

19. The system of claim 17, wherein the header file comprises a C header file.

20. The system of claim 17, further comprising the interface to the library function being saved in the shared library of the dynamic environment in an executable form.

21. The system of claim 17, wherein the dynamic environment comprises at least one of a text-based modeling application and a graphical-based modeling application.

22. A medium for use in a modeling and execution environment on an electronic device, the medium holding instructions executable using the electronic device for performing a computer-implemented method of accessing a library function in a shared library from a dynamic environment, the method comprising:

processing a header file of the library function to automatically specify parameter information for creating an interface to the library function, the processing automatically ensuring inputs to the interface to the library function are selected data types based on the header file;

creating the interface to access the library function in the shared library using the parameter information, the interface automatically converting a data type in an input to the interface to a selected data type for the library function; and saving the interface to the library function in an executable form for subsequent use.

23. The medium of claim 22, wherein processing the header file further comprises automatically defining parameters for the interface to the library function based on the header file.

24. The medium of claim 23, wherein automatically defining parameters for the interface to the library function based on the header file further comprises creating at least one data structure having selected parameters for interfacing with the library function.

25. The medium of claim 22, wherein automatically ensuring inputs to the interface to the library function are in the form of selected data types based on the header file further comprises the interface converting data types to the selected data types for the library function.

26. The medium of claim 22, wherein the shared library comprises one of a Dynamic Link Library (DLL) file and a file with a shared object (.so) file extension.

27. The medium of claim 22, wherein the header file comprises a C header file.

28. The medium of claim 22, wherein the dynamic environment comprises at least one of a text-based modeling application and a graphical-based modeling application.

\* \* \* \* \*